United States Patent [19]

Jackson et al.

[11] 4,432,389

[45] Feb. 21, 1984

[54] RESEAT RELIEF VALVE

[75] Inventors: Alan D. Jackson; Kenneth E. Day, both of Hutchinson, Kans.

[73] Assignee: The Cessna Aircraft Company, Wichita, Kans.

[21] Appl. No.: 349,101

[22] Filed: Feb. 16, 1982

[51] Int. Cl.³ .............................................. F16K 17/20
[52] U.S. Cl. .................................... 137/469; 137/541; 137/543.13; 137/543.21
[58] Field of Search ........... 137/469, 471, 541, 543.13, 137/543.21

[56] References Cited

U.S. PATENT DOCUMENTS

| | | | |
|---|---|---|---|
| 2,043,453 | 6/1936 | Vickers | 137/469 |
| 2,874,718 | 2/1959 | Kelly | 137/469 |
| 3,282,289 | 11/1966 | Vick | 137/469 X |
| 3,626,975 | 12/1971 | Bobst | 137/469 X |

Primary Examiner—Harold W. Weakley
Attorney, Agent, or Firm—Edward L. Brown, Jr.

[57] ABSTRACT

A relief valve with a low hysteresis closing curve with a fixed seat and a spring-biased poppet which is guided for longitudinal movement by an axial guide sleeve and aligns with its seat by pivoting about a fixed point through a small angle of rotation.

7 Claims, 1 Drawing Figure

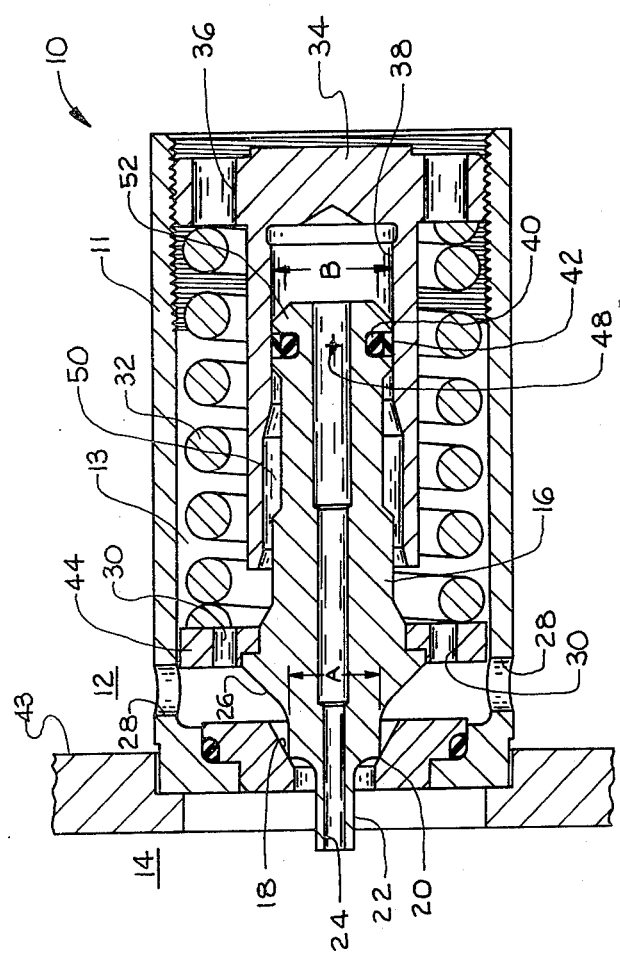

RESEAT RELIEF VALVE

BACKGROUND OF THE INVENTION

Relief valves, from their beginning with a simple ball and spring, have had widely varying characteristics as well as problems, many of which were ignored in the past. Today, however, due to the requirements for increased machine productivity and improved efficiency demands, the performance characteristics of relief valves have become more important and the design criteria more strict.

In the past, the ability of a relief valve to shut off after it has opened has not been a major concern, so consequently many have had very high hysteresis with a closing pressure substantially less than its opening pressure. Today in many mobile hydraulic applications, it is required that the valve close within a given band of pressure from the opening curve, as for example 100 PSI.

The reason relief valves close at a lower pressure than they open basically relates to mechanical friction in the valve. Designers today utilize low friction seals as one method to decrease the hysteresis of the valve. In refining the hysteresis performance, another problem was brought to light. This problem is the inability of the poppet to remain in alignment with the seat while the relief valve is functioning. To machine the parts of a relief valve with close enough tolerance to control the maximum misalignment is impractical and would cause the parts to bind, which destroys the ability of the valve to open and close at a specific pressure level.

Typical prior art solutions to this alignment problem allow the poppet, seat or both to freely float, as typified in U.S. Pat. Nos. 3,054,420, 3,583,431 and 3,621,875. Each of these last-mentioned designs require sliding metal-on-metal friction to align the poppet and seat, as for example in U.S. Pat. No. 3,621,875, seat 22 must slide on ring 21.

The ability of a relief valve to maintain a constant pressure level as the flow rate across the valve increases, has been handled by designers in a variety of methods. The momentum exchange concept of impacting and turning a high velocity stream against a surface of the poppet to increase the load against the spring to counteract the spring rate, is taught in the above-mentioned Williams U.S. Pat. No. 3,054,420.

Another method is the area gain method as described in the Diel U.S. Pat. No. 3,583,431, above-mentioned.

A still further method is the use of sized orifices to create pressure drops at various locations on the poppet to counteract the changing spring rate. Different valve designs use various combinations of the above-mentioned methods to achieve a flat pressure-flow curve.

SUMMARY OF THE INVENTION

The relief valve design of the present invention has a very low hysteresis between its opening and closing curves due to its reduced mechanical friction. The poppet slides axially on a low friction slip ring, while the alignment of the seat and poppet are brought about by rotating the poppet about its opposite end through a very small angle of rotation.

The fixed seat design allows the use of a smaller spring because of less spring travel and improved fatigue life, thereby allowing a much smaller package size for the overall relief valve cartridge.

The poppet stem extending into the fluid stream exhausting the valve provides a momentum exchange for the valve at increased flow rates, thereby allowing a flatter flow curve.

It is therefore the principal advantage of the present invention to provide a relief valve design with a low hysteresis closing curve.

Another object of the present invention is to provide a relief valve design with a fixed seat and a poppet which aligns with the seat by pivoting about a fixed point through a small angle of rotation.

A further object of the present invention is to provide a relief valve design with a smaller cartridge size which has improved opening and closing pressure-flow curves.

Another object of the present invention is to provide an improved poppet shape and cartridge configuration by utilizing a momentum exchange on the poppet and an orifice caused pressure drop in the cartridge to produce an improved flow curve.

A still further object of the present invention is to provide a relief valve design which minimizes the mechanical friction between the parts of the valve to improve hysteresis and leakage characteristics.

Further advantages and features of the invention are set forth in the following detailed description and accompanying drawing which is a longitudinal section of a fluid pressure relief valve embodying the present invention.

DESCRIPTION OF THE PREFERRED EMBODIMENT

The drawing illustrates a cartridge type relief valve which is generally referred to by reference numeral 10. The relief valve cartridge comprises a valve body 11 having inlet openings 28 around the periphery thereof, and an outlet opening 18 in the form of a beveled seat. The valve 10 is positioned in a hydraulic system with its left end of the cartridge seated within a wall 43. Wall 43, which could be in a directional control valve body or any other hydraulic component of the system, defines and separates a high pressure chamber 12 from a reservoir or drain chamber 14. Inside valve body 11 is located a poppet 16 urged against its beveled seat 18 by a compression spring 32 through a thrust ring 44. Aligning sleeve 34 is threadably received into the right end of valve body 11 with its outer diameter urging spring 32 into compression. Openings 36 in the outer diameter of sleeve 34 provide a means for engaging sleeve 34 and rotating same so as to vary the load on spring 32.

Concentrically positioned in aligning sleeve 34 is a bore 38 for receipt of an enlarged end 52 of poppet 16 which is chamfered on both sides. Located in the enlarged end 52 is an o-ring seal 40 and slip ring 42 which allows the poppet 16 to slide axially in bore 38 with relatively low friction. There is no pressure in the back side of bore 38 since the longitudinal passage 24 in the poppet is always connected to drain 14.

Located at the opposite end of poppet 16 is an annular sealing surface 20, which valves against seat 18, having a diameter "A" while the enlarged end 52 of poppet 16 has a larger diameter "B". Extending outwardly on poppet 16 from sealing surface 20 is a stem 22. When the valve is open, the high velocity stream exiting the valve impacts the stem 22. The interior chamber 13 of valve 10 is open to high pressure from chamber 12 not only through openings 28 but also openings 36 and 30.

OPERATION

The relief valve 10 of the present invention can be used either as a circuit or master relief valve. The spring 32 is preloaded, forcing the poppet 16 against seat 18 with a varying force, depending upon the desired relieving level. If, for example, the valve 10 is to open and close at 5000 PSI, the spring 32 is preloaded to approximately 400 pounds.

The effective area the high pressure in chamber 13 is acting against is a ring-shaped area with an inside diameter "A" and an outside diameter "B".

When the pressure in chamber 12 reaches the relieving level, poppet 16 moves to the right, as seen in the drawing, allowing flow across seat 18 to drain chamber 14. The fluid flows across openings 28, along arcuate surface 26 and beveled seat 18. As the high velocity stream exits the outlet opening, it impacts the stem 22, causing a momentum exchange on the poppet. This exchange causes a force to counteract the changing spring force. As the flow rate across the poppet 16 increases, a pressure drop is created across openings 28 which further helps the flow curve to remain flat.

Since the load exerted by most coil springs is not uniform throughout their circumference, there is always a tendency to cock the relief poppet to one side or the other. The thrust ring 44 is sized smaller than the inside diameter of body 11, thereby allowing the left end of poppet 16 to move back and forth a limited amount. Since the enlarged end 52 or poppet 16 can move only in an axial direction, the poppet will, in fact, pivot about a fixed point 48 through a very small angle. When ring 44 moves its maximum lateral travel, the poppet 16 will rotate a maximum of 5° degrees about point 48. The axial width of the enlarged chamfered end 52 is sufficiently narrow that even with a 5° degree rotation there is no metal-to-metal contact between the bore 38 and the end 52. O-ring seal 40 and slip ring 42 have a sufficiently tight fit in bore 38 to prevent any lateral movement in the end 52 of the poppet.

As poppet 16 begins to close, due to a pressure drop in chamber 12, the poppet 16 will move leftwardly toward its seat 18. Since the sealing surface 20 is not completely aligned with the seat 18, the beveled surface 18 along with a friction-free pivoting poppet 16 will cause the poppet 16 and seat 18 to align themselves and close the valve 10 with very little mechanical friction between the parts. The poppet 16 in a circuit relief configuration will rotate at a maximum of 2½° degrees about a fixed distance from the poppet seat 18. The closing curve of this valve will have a very low hysteresis compared with the opening curve.

Since the relief valve spring 32 is always loaded in the present design, as compared with the unloaded designs of the previously-mentioned patents, the fatigue life is increased allowing the use of smaller springs.

Having described the invention with sufficient clarity to enable those familiar with the art to construct and use it, we claim:

1. A fluid relief valve adapted to be utilized in a hydraulic system comprising:
 a body member defining a chamber therein;
 inlet and outlet openings in the body;
 a beveled circular seat located in the outlet opening;
 biasing means in the chamber;
 an axially movable pressure responsive poppet in said chamber having an annular sealing surface engageable with said seat approximate one end thereof acting in conjunction with the biasing means to close the valve;
 an enlarged end spaced at the opposite end of the poppet with a sealing means therearound;
 a guide sleeve means in the body having an axial bore therein for receipt of the enlarged end to guide the longitudinal movement of the poppet while allowing the poppet to rotate about the enlarged end through a limited angle to align the sealing surface with said seat.

2. A fluid relief valve as set forth in claim 1, wherein the poppet includes a longitudinal passage connecting said bore to drain.

3. A fluid relief valve as set forth in claim 1, wherein the poppet includes a stem extending axially from its sealing surface end, and a longitudinal passage in the poppet connecting said bore to drain through said stem.

4. A fluid relief valve as set forth in claim 1, wherein the poppet includes a reduced diameter substantially stem means extending axially from its sealing surface end a sufficient distance to intercept the high velocity discharge flow exiting the outlet opening of the valve and create a momentum exchange on said poppet when in a dynamic state.

5. A fluid relief valve as set forth in claim 1, wherein the inlet openings in said body create a pressure drop within said chamber during open flow positions of the relief valve.

6. A fluid relief valve as set forth in claim 1, wherein the annular sealing surface of the poppet has a lesser diameter than the enlarged end and a longitudinal passage in the poppet connects said bore to drain.

7. A fluid relief valve as set forth in claim 1, wherein the enlarged end is spaced longitudinally from the sealing surface end no less than four times the sealing surface diameter.

* * * * *